United States Patent [19]

Bosek

[11] Patent Number: 4,938,490
[45] Date of Patent: Jul. 3, 1990

[54] DRAWBACK COLLET
[75] Inventor: Ronald P. Bosek, Davisburg, Mich.
[73] Assignee: GTE Valenite Corporation, Troy, Mich.
[21] Appl. No.: 331,088
[22] Filed: Mar. 27, 1989

Related U.S. Application Data

[63] Continuation of Ser. No. 90,179, Aug. 27, 1987, abandoned.

[51] Int. Cl.$^5$ .............................................. B23B 31/10
[52] U.S. Cl. ........................................ 279/42; 279/51; 279/52
[58] Field of Search ................... 279/42, 43, 46 R, 48, 279/50, 51, 52, 53, 56, 57, 58, 59

[56] References Cited

U.S. PATENT DOCUMENTS

| 1,094,346 | 4/1914 | Schellenbach | 279/51 |
| 2,293,176 | 8/1942 | Sjogren | 279/53 |
| 2,574,754 | 11/1951 | Peters | 279/51 |
| 3,030,119 | 4/1962 | Myers | 279/53 |
| 3,143,356 | 8/1964 | Pray | 279/51 |
| 3,664,216 | 5/1972 | Kladich | 279/52 |
| 4,218,165 | 8/1980 | Riddersholm | 279/51 |

FOREIGN PATENT DOCUMENTS

| 864346 | 12/1952 | Fed. Rep. of Germany | 279/52 |
| 104625 | 6/1985 | Japan | 279/42 |
| 00915 | 3/1984 | PCT Int'l Appl. | 29/568 |

Primary Examiner—Daniel Howell
Attorney, Agent, or Firm—David J. Koris

[57] ABSTRACT

A tapered drawback collet which engages a conically tapered collet chamber in chuck body. A collet extension is axially displaced through high reduction gearing including a worm gear and threaded feed ring acting on a sleeve having only axial contact with the collet extension and therefore is free of any radial loading.

2 Claims, 2 Drawing Sheets

DRAWBACK COLLET

This is a continuation of copending application Ser. No. 090,179 filed on Aug. 27, 1987 now abandoned.

BACKGROUND OF THE INVENTION

Collets are known in the art which have flexible split segments radially displaced by axial movement engaging a conically tapered periphery of the segments against a collet closing sleeve having internal matching taper. Such a construction is disclosed in prior art U.S. Pat. No. 3,802,713 which includes a lever operated collet chuck with a collet having screw-threads on the rear external surface thereof, and slots at the front to permit opening and closing about the work, a collet closing sleeve moved by a plurality of thrust balls housed in the chuck body and moved radially inwardly by a lever operated actuation sleeve, a geared ring in screw-threaded engagement with the collet, and a pinion turned by a key being employed for rotating the ring to adjust the collet axially into initial engagement with the work.

BRIEF DESCRIPTION OF THE PRESENT INVENTION

The present invention employs a collet chuck body having an integrally formed rigid annular conically tapered collet chamber and a collet having flexible segments with matching tapered chamber engaging surface and a collet extension engageable to produce axial displacement within said body. A transverse worm in the body actuates an axially retained worm gear having a threaded connection with a sleeve engaging the extension of the collet to transmit axial displacement under the mechanical advantage of the worm gear and threaded sleeve. Radial clearance between the sleeve and collet is provided to prevent any radial force from thread runout or otherwise to be applied to the collet. The collet is keyed via a thrust collet at the end of the collet which is also piloted in the body for added stability.

DETAILED DESCRIPTION OF THE PREFERRED EMBODIMENT WITH REFERENCE TO THE DRAWINGS

Figure 1:
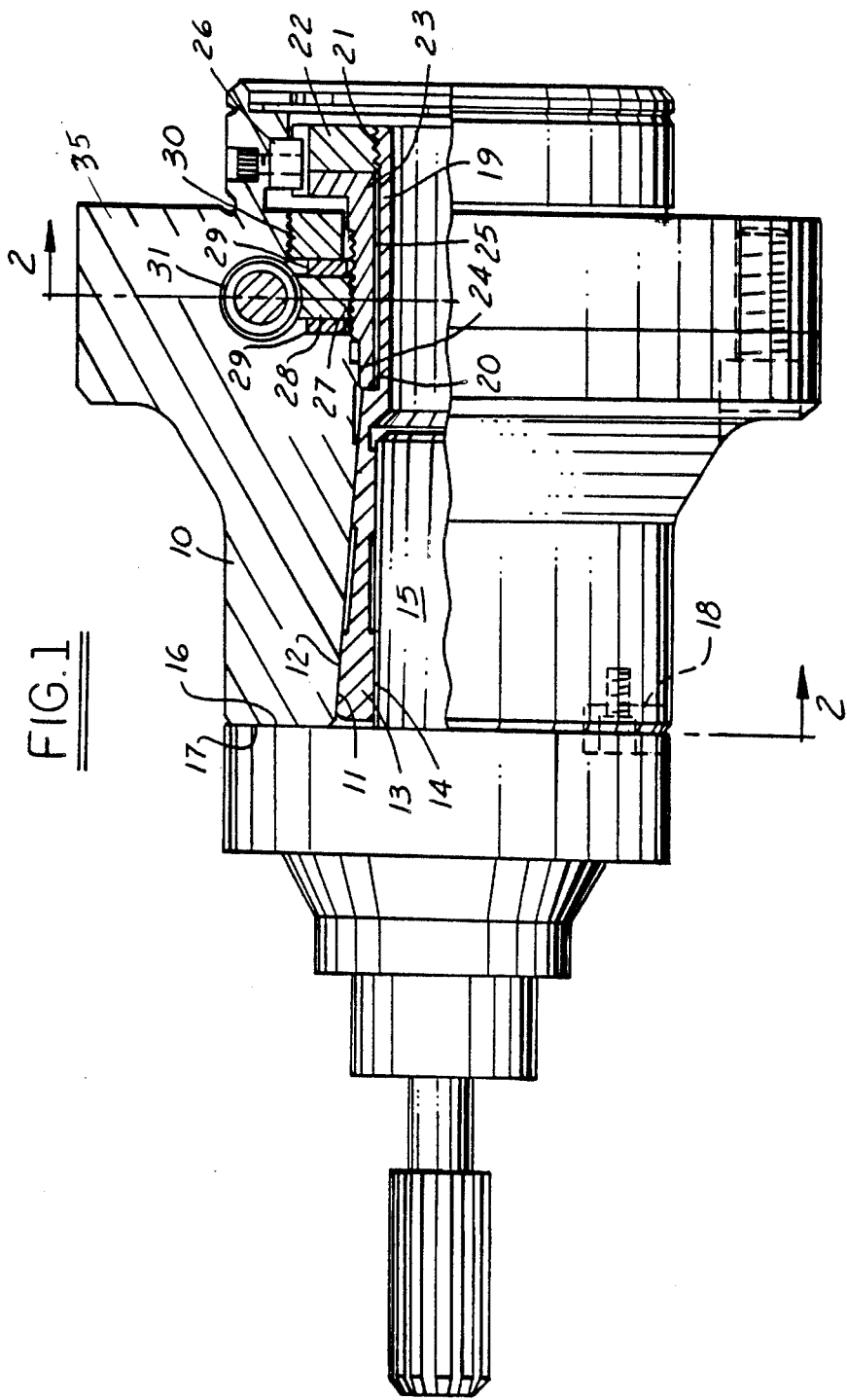
FIG. 1 is a partially sectioned side elevation of a collet chuck constructed in accordance with the present invention taken along the line 1—1 of FIG. 2.
Figure 2:
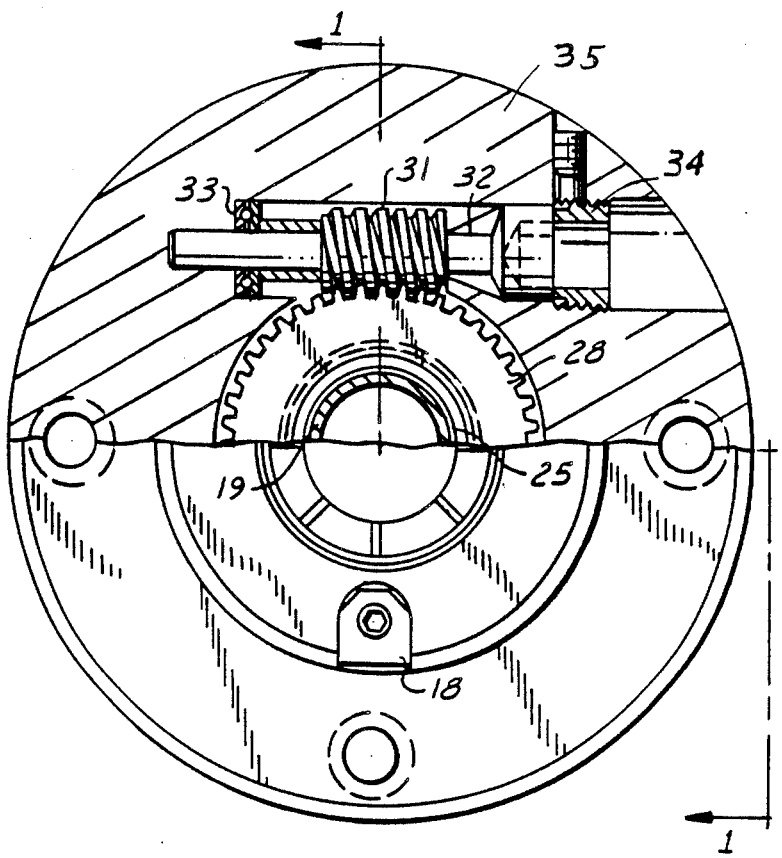
FIG. 2 is a partially sectioned end elevation of the collet chuck taken along the line 2—2 of FIG. 1.
Figure 3:
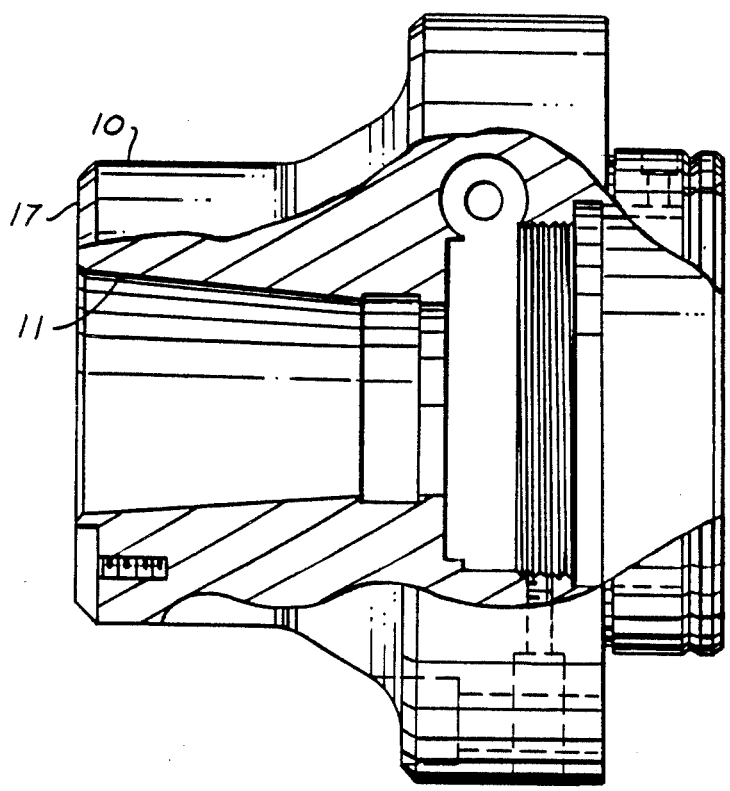
FIG. 3 is a partially sectioned side elevation of the collet body per se.

Collet body 10 is provided with tapered collet chamber 11 engaged by matching tapered perimeter of collet 13 having multiple flexible segments capable of radially inward displacement of respective internal cylindrical surface segments 14 for engaging tool or work piece shank 15 normally having shoulder 16 engaging end 17 of body 10 with interengaging drive key 18 when required for high torque transmission.

Integral collet extension 19 is provided with shoulder 20 and threaded end 21 for threaded retainer ring 22 providing axially engageable surfaces for intermediate sleeve 23 piloted within body shoulder 24, with clearance 25 provided throughout its length relative to collet extension 19. Both retention ring 22 and sleeve 23 are retained by key 26 against rotation relative to body 10.

External thread 27 on sleeve 23 is engaged by internally threaded worm gear 28 retained axially relative to body 10 between thrust washers 29 held in spaced relation by retainer ring 30 having threaded engagement within body 10. Worm 31 drivingly mounted on spindle 32 axially retained by thrust bearing 33 and lock screw 34 engages worm gear 28 for rotation with high mechanical advantage by manual actuation of an Allen wrench within head 35 which provides axial displacement of sleeve 23 and corresponding displacement of collet 13 with radial clearance 25 assuring no possibility of radial loading of collet extension 19.

Due to the compound mechanical advantage of worm gear and threaded feed at 27, a full clamping engagment of shaft 15 can be provided with tooling shoulders 16 and 17 locked in firm engagement due to the continuous axial feed of collet 13 in reaching full clamping position. This is to be distinguished from the prior art '713 construction where the collet is initially drawn back against an axially displaceable tapered closing sleeve through an Allen wrench driven pinion with final clamping produced by lever actuated displacement of the sleeve in an opposite direction to produce radial clamping of the collet.

It is important for repeatability that the collet return to the seat precisely the same everytime the mechanism is actuated which is assured in the present construction by the integral provision of tapered reaction surface directly in the body, elimination of any possible radial force imparted to the collet extension during the clamping actuation, and by continuous axial drawback actuation of the collet assuring firmly locked tool shoulder engagement in reaching final clamping position.

I claim:

1. Drawback collet chuck comprising an annular body, a rigid annular tapered collet chamber within said body, a collet having flexible segments each with matching tapered peripheral chamber engaging surfaces and cylindrical interior clamping surfaces, said collet having a coaxial extension integral thereto, extending through said body for added stability, said collet having a shoulder means on said extension for transmitting axial displacement thereto, sleeve means engaging said shoulder means with radial clearance relative to said extension, a threaded perimeter on said sleeve engaged by a worm gear, an actuating worm mounted tangentially to said worm gear to effect axial displacement of said collet extension within said chamber and corresponding radial clamping displacement wherein said actuating worm is tangentially mounted for worm gear driving engagement with axial thrust bearing means in said body, and thrust bearing means for axially retaining said worm gear during rotation on said sleeve.

2. Drawback collet of claim 1 including a radial body and surface at the entrance of said collet chamber for engaging a shoulder flange of tooling or work piece to be held by said drawback collet.

* * * * *